United States Patent
Mori et al.

(10) Patent No.: US 8,447,159 B2
(45) Date of Patent: May 21, 2013

(54) STREAM RECORDING APPARATUS

(75) Inventors: Hirofumi Mori, Koganei (JP);
Tatsunori Saito, Sagamihara (JP); Isao Masuda, Fuchu (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 1186 days.

(21) Appl. No.: 11/769,336

(22) Filed: Jun. 27, 2007

(65) Prior Publication Data

US 2008/0184316 A1 Jul. 31, 2008

(30) Foreign Application Priority Data

Jan. 31, 2007 (JP) ................................. 2007-022259

(51) Int. Cl.
*H04N 5/85* (2006.01)

(52) U.S. Cl.
USPC ........... 386/201; 386/210; 386/214; 386/220; 725/62

(58) Field of Classification Search
USPC .................. 386/201, 210, 214, 220
See application file for complete search history.

(56) References Cited

U.S. PATENT DOCUMENTS

| | | | | |
|---|---|---|---|---|
| 2002/0150392 | A1* | 10/2002 | Yoo et al. | 386/111 |
| 2007/0086729 | A1* | 4/2007 | Lee | 386/95 |
| 2007/0098366 | A1* | 5/2007 | Nakashika et al. | 386/95 |
| 2009/0154890 | A1* | 6/2009 | Nakamura et al. | 386/46 |

FOREIGN PATENT DOCUMENTS

JP 2001-359049 A 12/2001

* cited by examiner

*Primary Examiner* — Thai Tran
*Assistant Examiner* — Jose Mesa
(74) *Attorney, Agent, or Firm* — Maschoff Brennan

(57) ABSTRACT

A stream recording apparatus includes a reception unit configured to receive a transport stream containing TS packets which include PCRs and PTSs, a first storage unit configured to store the transport stream, an analysis unit configured to analyze the PCRs and the PTSs, a counter configured to count a STC on the basis of one of the PCRs, a calculation unit configured to calculate a reproduction time corresponding to a PTS if the PTS is on a same time base with reference to a STC obtained upon reception of the TS packet having the PTS, and to stop calculating the reproduction time corresponding to the PTSs if the PTSs is on a different timebase, and a second storage unit configured to store the reproduction time in association with the one of the PTSs.

19 Claims, 6 Drawing Sheets

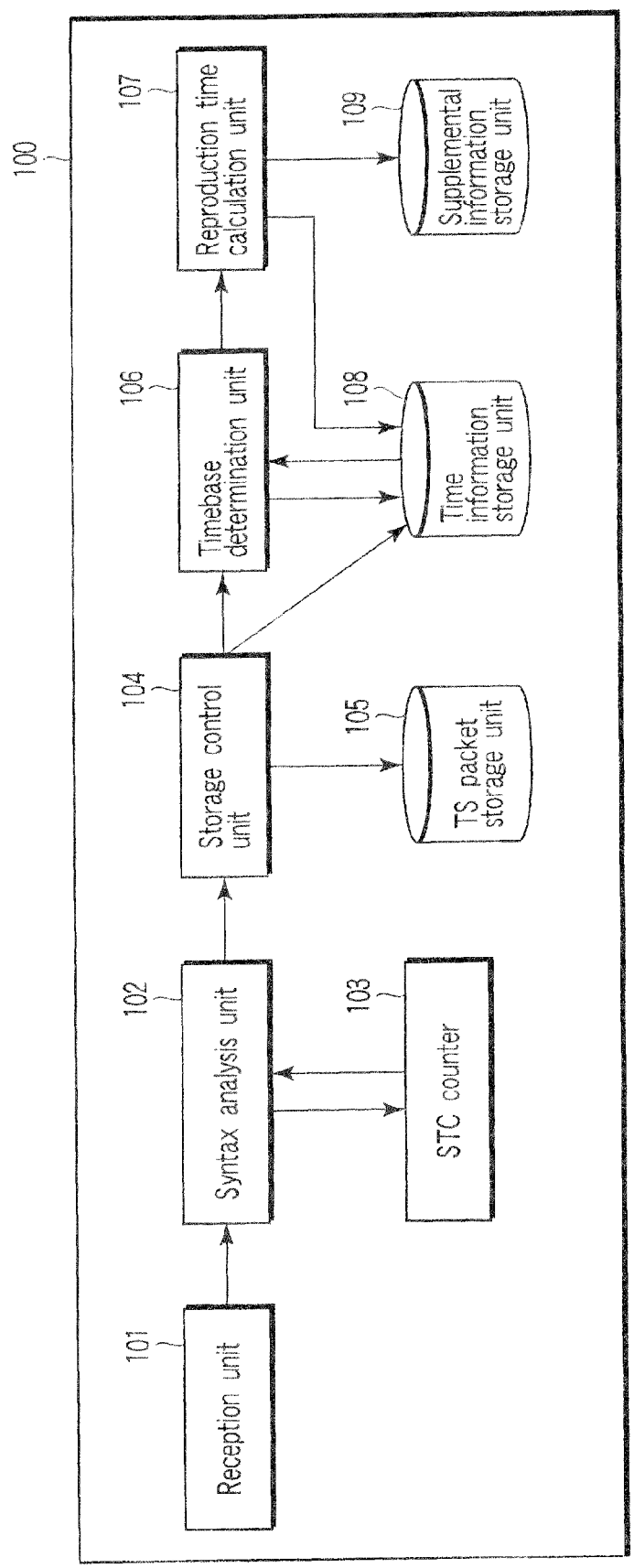
F I G. 1

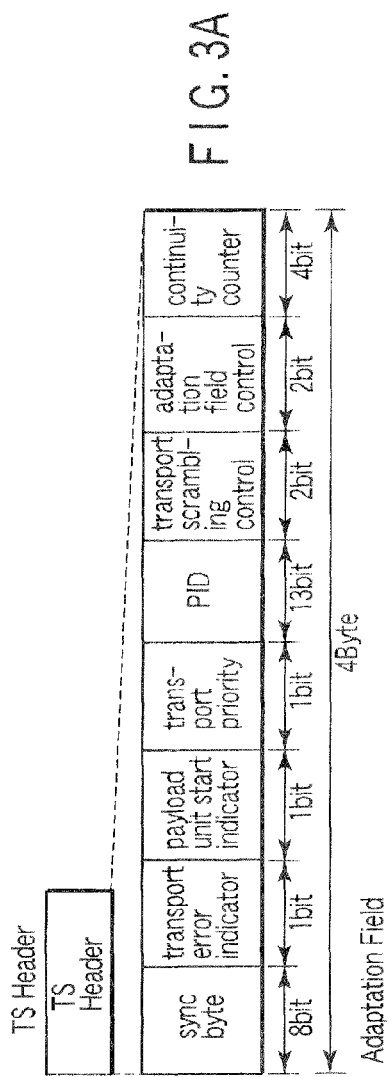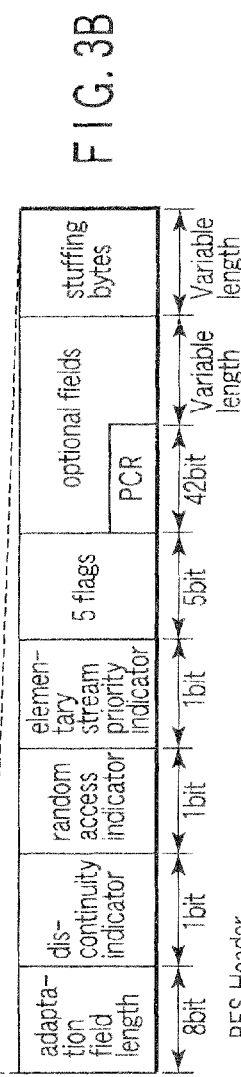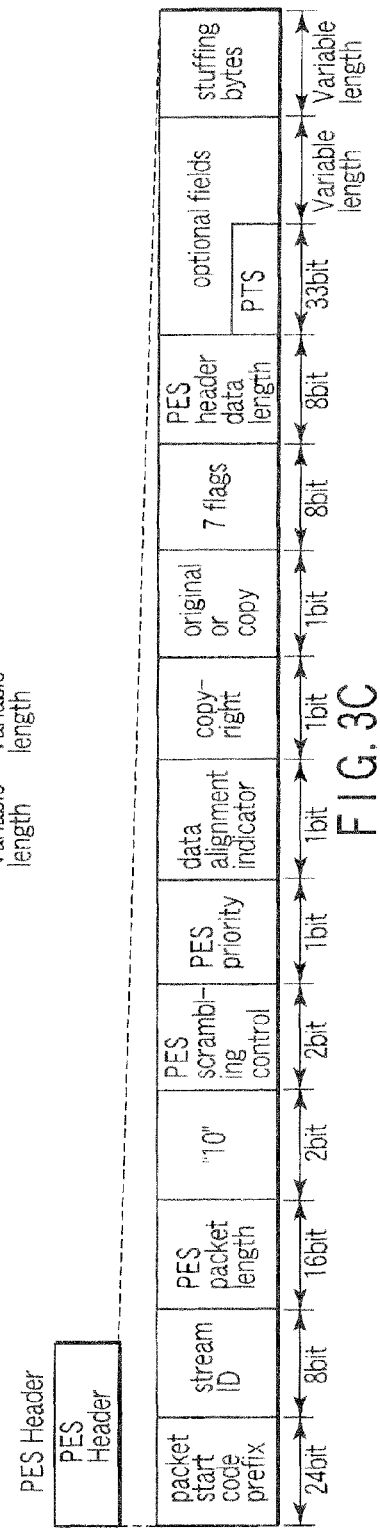
F I G. 3A
F I G. 3B
F I G. 3C

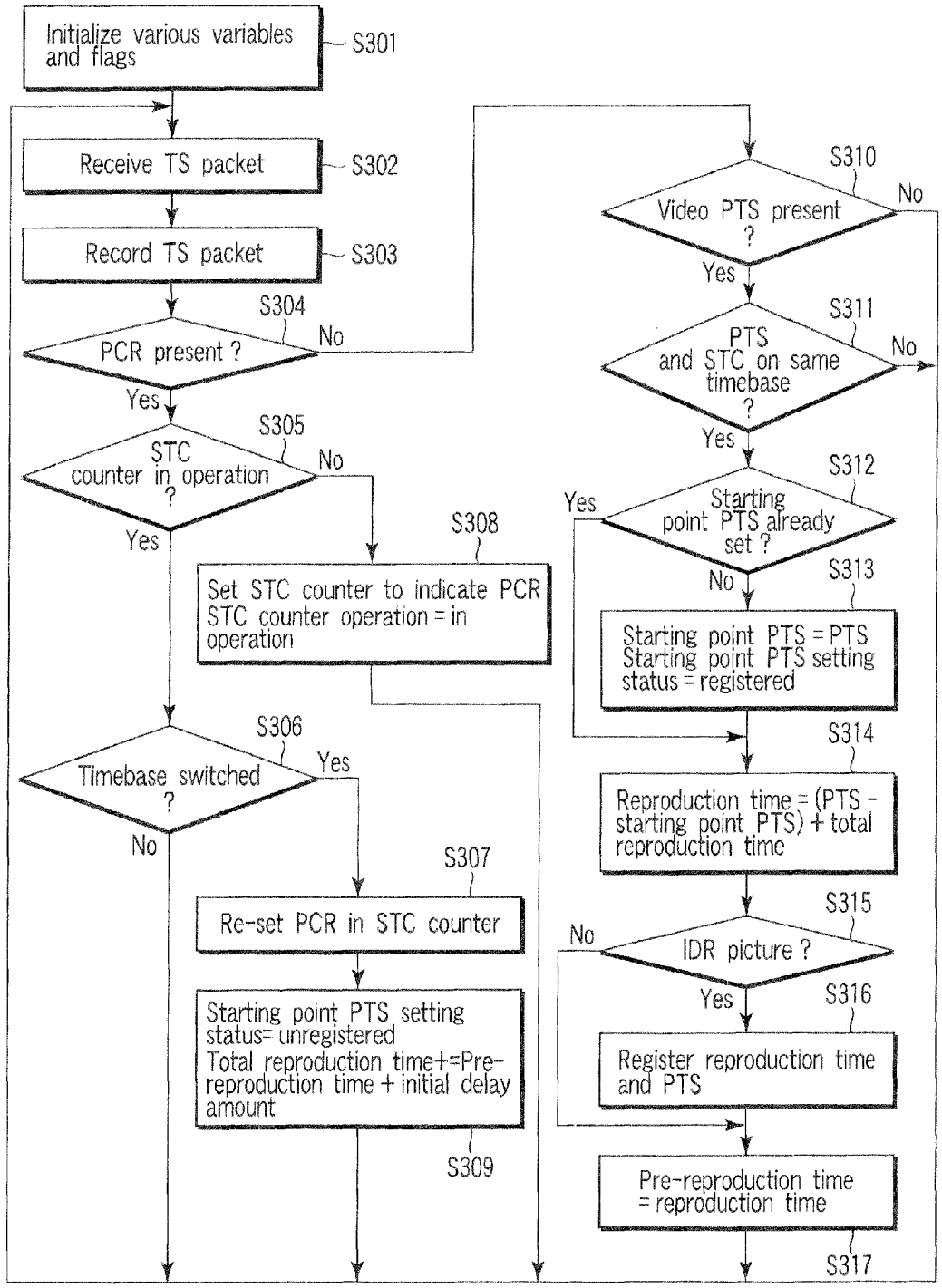
F I G. 4

TOD file

| ETS Header (4Byte) | TS Packet (188Byte) |
| ETS Header (4Byte) | TS Packet (188Byte) |
| ... | ... |
| ETS Header (4Byte) | TS Packet (188Byte) |

F I G. 6A

MOI file

| MOI Header (128Byte) |
| TSE 5 Header (64Byte) |
| TSE Table 5 Header (28Byte) |
| TSE INFO (12Byte) |
| ... |
| TSE INFO (12Byte) |

Expanded TSE INFO fields:
- Reserved (1Bit)
- Entry Type (2Bit)
- Entry PES Packet Num [11..7]
- Entry PES Packet Num [6..0] (12Bit)
- TPI [23..16]
- TPI [15..8]
- TPI [7..0] (25Bit)
- PTS [23..16]
- PTS [15..8]
- PTS [7..0] (24Bit)
- Pb Offset [31..24]
- Pb Offset [23..16]
- Pb Offset [15..8]
- Pb Offset [7..0] (32Bit)
- TPI [24]

F I G. 6B

STREAM RECORDING APPARATUS

CROSS-REFERENCE TO RELATED APPLICATIONS

This application is based upon and claims the benefit of priority from prior Japanese Patent Application No. 2007-022259, filed Jan. 31, 2007, the entire contents of which are incorporated herein by reference.

BACKGROUND OF THE INVENTION

1. Field of the Invention

The present invention relates to apparatuses in which transport streams are recorded.

2. Description of the Related Art

For terrestrial digital broadcasting received by mobile phones, mainly their third generation (this broadcasting is called one segment), video data is encoded in accordance with H.264/AVC, and audio data is encoded in accordance with MPEG-2 AAC. Encoded video and audio data are called Elementary Streams (ES) and are multiplexed into transport streams in MPEG-2 SYSTEMS as Packetized Elementary Stream (PES) packets for transmission. Transport Stream (TS) packets are arranged in the transport stream. The TS packet can contain attribute information indicating the type of bit streams constituting video and audio information, the bit streams, and reference clock information called Program Clock Reference (PCR) and used to synchronize media. TS packets are transported by radio or wire.

A receiver records TS packets, and upon receiving a TS packet having PCR, uses PCR to control System Time Clock (STC) for clock synchronization with a transmitter. Specifically, the receiver extracts the value of the transmitter's PCR sampled at 27 MHz and compares it with the count value of the receiver's STC, to adjust STC (clock recovery). When the value of STC, counted by an STC counter, becomes equal to or greater than that of Presentation Time Stamp (PTS) contained in the TS packet, the receiver synchronously reproduces ES.

To more accurately synchronize the transmitter's and receiver's clocks, for example, Jpn. Pat. Appln. KOKAI Publication No. 2001-359049 proposes a scheme according to which, to delete a TS packet, the receiver generates a control packet and records packet deletion sections and the number of packets deleted, in the control packet. According to the proposal in Jpn. Pat. Appln. KOKAI Publication No. 2001-359049, the control packet enables an encoded program to be stream-reproduced in synchronism with streaming signals for transmission.

Proposal has been made of a technique for recording supplemental information such as PTS and reproduction time in a supplemental file. SD-Video for ISDB-TS has been known as a recording format for the supplemental file. With SD-Video for ISDB-TS, PTS is specified as a starting point (starting point PTS), and a reproduction time is calculated on the basis of the starting point PTS and each PTS in a TS packet. The reproduction time is then recorded in the supplemental file.

A timebase may be switched in the middle of a transport stream. PTS in a TS packet received after the switching of the timebase may deviate significantly from PTS in a TS packet received before the switching. Consequently, after the switching of the timebase, even the calculation of the reproduction time using PTS obtained before the timebase switching as a starting point PTS may disadvantageously result in a discontinuous value deviating significantly from the original reproduction time. In particular, if special reproduction such as skip reproduction is executed before and after timebase switching, it may disadvantageously not be executed normally. That is, the timebase switching may cause a value deviating significantly from the original reproduction time to be presented as a reproduction time for a recorded stream.

Therefore, it is not necessarily effective on the control of reproduction timings for TS packets to use PTS obtained before timebase switching as a starting point PTS to calculate a reproduction time and to record the reproduction time in a supplemental file.

BRIEF SUMMARY OF THE INVENTION

An object of the present invention is to provide a stream recording apparatus in which a continuously incrementing reproduction time can be recorded in spite of possible timebase switching.

According to an aspect of the invention, there is provided a stream recording apparatus comprising: a reception unit configured to receive a transport stream containing transport stream packets which include program clock references and presentation time stamps; a first storage unit configured to store the transport stream; an analysis unit configured to analyze the program clock references and the presentation time stamps; a counter configured to count a system time clock on the basis of one of the program clock references; a calculation unit configured to calculate a reproduction time corresponding to a presentation time stamp if the presentation time stamp is on a same time base with reference to a system time clock obtained upon reception of the transport stream packet having the presentation time stamp, and to stop calculating the reproduction time corresponding to the presentation time stamps if the presentation time stamps is on a different timebase; and a second storage unit configured to store the reproduction time in association with the one of the presentation time stamps.

According to another aspect of the invention, there is provided an apparatus capable of receiving moving picture, comprising: a receiving unit configured to receive a plurality of first packets which can contain first time information to be used to control a system clock and a part of a second packet, the second packet contains at least one encoded frame of the moving picture and second time information to be used to control reproduction of the frame; a counter configured to count the system clock based on the first time information; an analyzing unit configured to analyze the second time information and the system clock which is counted by the counter at the time of reception of the first packet containing the second time information; and a calculation unit configured to calculate reproduction time corresponding to the second time information if a difference between the second time information and the system clock is smaller than a predetermined threshold and stop calculating the presentation time if the difference exceeds the threshold.

According to another aspect of the invention, there is provided an apparatus capable of receiving moving picture, comprising: a receiving unit configured to receive a plurality of first packets which can contain first time information to be used to control a system clock and a part of a second packet, the second packet contains at least one encoded frame of the moving picture and second time information to be used to control reproduction of the frame; a counter, which is adjustable based on the first time information, configured to count the system clock; an analyzing unit configured to analyze the second time information and the system clock which is counted by the counter at the time of reception of the first packet containing the second time information; and a calculation unit configured to calculate reproduction time corresponding to the second time information if a difference between the second time information and the system clock is smaller than a predetermined threshold and stop calculating the presentation time if the difference exceeds the threshold.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a stream recording apparatus in accordance with an embodiment of the present invention;

FIG. 3A is a diagram showing the structure of a TS header in the TS packet shown in FIG. 2;

FIG. 3B is a diagram showing the structure of an adaptation field in the TS packet shown in FIG. 2;

FIG. 3C is a diagram showing the structure of the PES header shown in FIG. 2;

FIG. 4 is a flowchart showing operations performed by the stream recording apparatus shown in FIG. 1;

FIG. 6A is a diagram showing the structure of a TOD file in accordance with SD-VIDEO standards which is stored in a TS packet storage unit shown in FIG. 1; and FIG. 6B is a diagram showing the structure of an MOT file in accordance with SD-VIDEO standards which is stored in a supplemental information storage unit shown in FIG. 1.

DETAILED DESCRIPTION OF THE INVENTION

Figure 2:
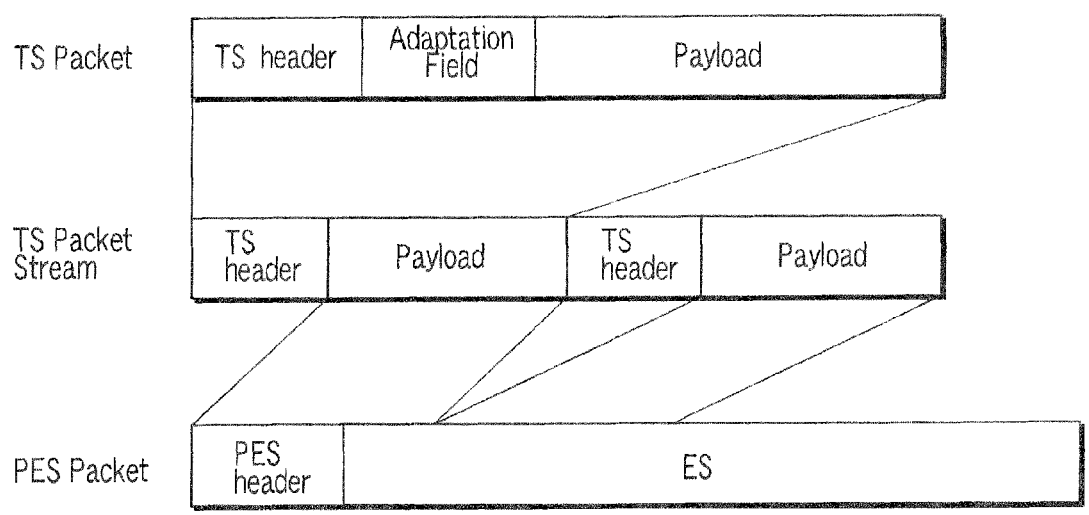
FIG. 2 is a diagram showing the structure of a TS packet processed by the stream recording apparatus shown in FIG. 1, the structure of a transport stream composed of TS packets, and the structure of a PES packet contained in payloads of the TS packets.

A stream recording apparatus in accordance with an embodiment of the present invention will be described below in detail with reference to the drawings.

FIG. 1 shows a stream recording apparatus 100 in accordance with an embodiment of the present invention. As shown in FIG. 1, the stream recording apparatus 100 has a reception unit 101 that receives transport stream via a wireless or wired network, a syntax analysis unit 102 that analyzes the syntax of a TS header and an adaptation field which are contained in a Transport Stream (TS) packet in a transport stream, an STC counter 103 that sets the System Time Clock (STC) for the stream recording apparatus 100, a storage control unit 104 that controls recording performed by the stream recording apparatus 100, a TS packet storage unit 105 that sequentially stores received TS packets, a timebase determination unit 106 that determines whether or not a timebase in a transport stream has been switched, a reproduction time calculation unit 107 that calculates a reproduction time from PTS in response to timebase switching determination, a time information storage unit 108 that stores various variables and flags required to calculate a starting point PTS and reproduction times such as a total reproduction time, and a supplemental information storage unit 109 that stores the PTSs and reproduction times in association with one another.

The reception unit 101 receives a plurality of TS packets transmitted via a network and transfers them to the syntax analysis unit 102.

The syntax analysis unit 102 analyzes the TS packets transferred from the reception unit 101 and determines their syntax. As shown in FIG. 2, the TS packet has a fixed length of 188 bytes and is made of a 4-byte TS header, an optional adaptation field, and a payload.

As shown in FIG. 3A, the TS header stores a 13-bit packet identifier (PID) indicating whether the TS packet is transmitting video or audio data. The same video data has the same PID, and the same audio data has the same PID. Accordingly, PID can be used to restore an original Elementary Stream (ES). The TS header also contains a 1-bit transport error indicator indicating whether or not any error is occurred in the TS packet and a 2-bit adaptation field control indicating whether or not an adaptation field and a payload are present. Here, the following are specified for the adaptation field control: "11" indicates that both an adaptation field and a payload are present, "10" indicates that an adaptation field is present, while no payload is present, "01" indicates that no adaptation field is present, while a payload is present, and "00" indicates "Reserved for Future Use" (RFU). The TS header further comprises a sync byte indicating the head of the TS packet to a decoder and a payload unit start indicator indicating that a new PES packet starts from a payload in the TS packet. The TS header also comprises a transport priority indicating the importance of the TS packet and a 2-bit transport scrambling control indicating whether or not the payload in the TS packet is scrambled. The TS header also comprises a 4-bit continuity counter that makes it possible to detect whether or not a TS packet having the same PID as that of this TS packet has been partly discarded.

As shown in FIG. 3B, the adaptation field includes a 1-bit discontinuity indicator indicating whether or not the timebase has been switched and an optional field of a variable length which contains a 42-bit PCR. As shown in FIG. 2, a Packetized Elementary Stream (PES) packet is divided into pieces, which are stored in the respective payloads. By the way, the PES packet contains at least one encoded frame composing moving picture or audio data. The adaptation field further comprises an 8-bit adaptation field length, a random access indicator, an elementary stream priority indicator, a random access indicator, an elementary stream priority indicator, 5 flags including a 1-bit PCR flag (not shown) indicating whether or not PCR exists in the adaptation field, and stuffing bytes of a variable length.

As shown in FIG. 3C, the PES header is composed of a 24-bit packet start prefix, an 8-bit stream id, a 16-bit PES packet length, "10", a 2-bit PES scrambling control, a PES priority, a data alignment indicator, a copy right, an original or copy, 7 flags, an 8-bit PES header length, an optional field of a variable length which describes PTS of a leading frame in the PES packet, and stuffing bytes of a variable length.

With an integrated digital broadcasting service for terrestrial waves ISDB-T, a Reed Solomon (RS) code follows the TS packet, and the result of an error correction made by the RS code is reflected in the error indicator to allow a receiver to detect whether or not an error is contained in the TS packet.

The stream recording apparatus 100 in accordance with the present embodiment does not record any TS packet with an error.

The STC counter 103 counts STC subjected to clock adjusted based on the Program Clock Reference (PCR) analyzed by the syntax analysis unit 102. The STC counter 103 performs or suspends an operation depending on the value of a flag "STC counter operation".

The storage control unit 104 records a TS packet outputted from the syntax analysis unit 102, in the TS packet storage unit 105. If the TS packet has PTS, the storage control unit 104 transfers PTS to the timebase determination unit 106 together with STC obtained at the time of the reception.

The timebase determination unit 106 compares PTS from the storage control unit 104 with STC obtained at the time of the reception of the TS packet having PTS to determine whether or not the timebase has been switched. That is, if the difference between PTS and STC is equal to or greater than a preset threshoid THtb, the timebase determination unit 106 determines that the "timebase has been switched". Otherwise the timebase determination unit 106 determines that the "timebase has not been switched". The threshold THtb may be an initial delay time of 1.5 sec for PTS specified in ARIB TR-B24, an initial cpb removal delay in Supplemental Enhancement Information (SEI) in H.264/AVC, or another preset value. Alternatively, the timebase determination unit 106 may make timebase switching determination by using the discontinuity indicator in the adaptation field to detect discontinuity. If the timebase determination unit 106 determines that the "timebase has not been switched", the timebase determination unit 106 transfers PTS to the reproduction time calculation unit 107.

If no starting point PTS is set in the time information storage unit 108, the reproduction time calculation unit 107 sets PTS received from the timebase determination unit 106 as a starting point PTS. If the starting point PTS is set in the time information storage unit 108, the reproduction time calculation unit 107 obtains a reproduction time by adding the difference between PTS transferred by the timebase determination unit 106 and the starting point PTS, to the total reproduction time. The reproduction time calculation unit 107 records the reproduction time obtained in the supplemental information storage unit 109 in association with PTS.

Now, the operation of the stream recording apparatus in FIG. 1 will be described with reference to the flowchart in FIG. 4.

When processing is started, variables and flags are initialized in a control system (not shown) that controls the whole stream recording apparatus 100. That is, by way of example, in step S301, a flag "STC counter operation" indicating whether or not the STC counter 103 is counting STC is set to indicate "not in operation". A flag "starting point PTS setting status" indicating whether or not any starting point PTS is set in the time information storage unit 108 is set to indicate "unregistered". Moreover, 0 is substituted into variables "total reproduction time" and "pre-reproduction time".

In step S302, following the initialization, the reception unit 101 receives a TS packet in a transport stream transmitted via the network, and then transfers it to the syntax analysis unit 102. Then, in step S302, the TS packet received by the reception unit 101 is recorded in the TS packet storage unit 105 (step S303). That is, the TS packet is transferred from the syntax analysis unit 102 to the storage control unit 104 and recorded in the TS packet storage unit 105 by the storage control unit 104.

The syntax analysis unit 102 then determines whether or not the transferred TS packet has PCR. If the TS packet has PCR, the syntax analysis unit 102 analyzes PCR and then the process proceeds to step S305. Otherwise the process proceeds to step S310 (step S304). The syntax analysis unit 102 determines whether or not PCR is present in the TS packet by, for example, referencing PCR in the adaptation field.

In step S305, the syntax analysis unit 102 determines whether or not the STC counter 103 is in operation. If the STC counter 103 is in operation, the process proceeds to step S306. Otherwise the process proceeds to step S308. Specifically, the syntax analysis unit 102 determines the operation of the STC counter 103 by referencing the flag "STC counter operation".

In step S306, the syntax analysis unit 102 determines whether or not the timebase has been switched. If the syntax analysis unit 102 determines that the "timebase has been switched", the process proceeds to step S307. Otherwise, the process returns to step S302. For example, the syntax analysis unit 102 determines that the "timebase has been switched" when the difference between the current STC counted by the STC counter 103 and PCR analyzed in step S304 is greater than a preset amount.

In step S307, the syntax analysis unit 102 re-sets PCR analyzed in step S304 in the STC counter 103 and notifies the storage control unit 104 of the re-set information. The storage control unit 104 updates the flag "starting point PTS setting status" and variable "total reproduction time" recorded in the time information storage unit 108 and then returns to step S302 (step S309). Specifically, the storage control unit 104 sets the flag "starting point PTS setting status" to indicate "unset" and adds the variable "pre-reproduction time" and a constant "initial delay amount" to the variable "total reproduction time". The constant "initial delay amount" may be, for example, one frame interval or the initial delay amount in ES. With H.264/AVC, the constant "initial delay amount" may be the initial cpb removal delay in SEI.

In step S308, the syntax analysis unit 102 sets PCR analyzed in step S304, in the STC counter 103, and also sets the flag "STC counter operation" to indicate "in operation". The process then returns to step S302.

In step S310, the syntax analysis unit 102 determines whether or not the TS packet received by the reception unit 101 in step S302 belongs to a video transport stream and has (video) PTS. If the TS packet has PTS, the syntax analysis unit 102 transfers PTS to the timebase determination unit 106 via the storage control unit 104 together with STC acquired by the STC counter 103, and then the process proceeds to step S311. Otherwise, the process returns to step S302.

In step S311, the timebase determination unit 106 determines whether or not the timebase has been switched, on the basis of PTS and STC acquired in step S310. If the timebase determination unit 106 determines that the "timebase has not been switched", it transfers PTS to the reproduction time calculation unit 107 and then the process proceeds to step S312. Otherwise, the process returns to step S302. Specifically, if the difference between PTS and STC acquired in step S310 is smaller than the threshold THtb, the timebase determination unit 106 determines that the "timebase has not been switched". Otherwise the timebase determination unit 106 determines that the "timebase has been switched".

In step S312, the reproduction time calculation unit 10-7 determines whether or not the starting point PTS has been set. If the starting point PTS has been set, the process proceeds to step S314. Otherwise the process proceeds to step S313. Specifically, the reproduction time calculation unit 107 determines whether or not the starting point PTS has been set by referencing the flag "starting point PTS setting status" recorded in the time information storage unit 108.

In step S313, the reproduction time calculation unit 107 updates the variable "starting point PTS" and flag "starting point PTS setting status" and then the process proceeds to step S314. Specifically, the reproduction time calculation unit 107 substitutes PTS acquired in step S311 into the variable "starting point PTS" recorded in the time information storage unit 108. The reproduction time calculation unit 107 sets the flag "starting point PTS setting status" recorded in the time information storage unit 108 to indicate "registered".

In step S314, the reproduction time calculation unit 107 calculates the reproduction time. Specifically, the reproduction time calculation unit 107 adds the variable "total reproduction time" recorded in the time information 108 to the difference between PTS acquired in step S311 and the variable "starting point PTS" stored in the time information storage unit 108, and then outputs the resulting reproduction time.

Then, the reproduction time calculation unit 107 determines whether or not the current processing target picture is an Instantaneous Decoder Refresh (IDR) picture. If the processing target picture is an IDR picture, the process proceeds to step S316. Otherwise the process proceeds to step S317 (step S315). In this case, step S315 is provided to register the reproduction times and PTSs only for IDR pictures. However, step S315 may be omitted so as to also register the reproduction times and PTSs for non-IDR pictures.

In step S316, the reproduction time calculation unit 107 associates the reproduction time calculated in step S314 with PTS acquired in step S311 and record them in the supplemental information storage unit 109. The process then proceeds to step S317.

In step S317, the reproduction time calculation unit 107 updates the variable "pre-reproduction time" recorded in the time information storage unit 108. Specifically, the reproduction time calculation unit 107 substitutes the reproduction time calculated in step S314 into the variable "pre-reproduction time" and records the result in the time information storage unit 108. Then, the process returns to step S302.

The above series of processes are performed on the received TS packet. Then, the TS packet to be reproduced can be accumulated in the TS packet storage unit 105, and supplemental information containing PTS from the TS packet and the reproduction time corresponding to the PTS can be accumulated in the supplemental information storage unit 109.

Figure 5:
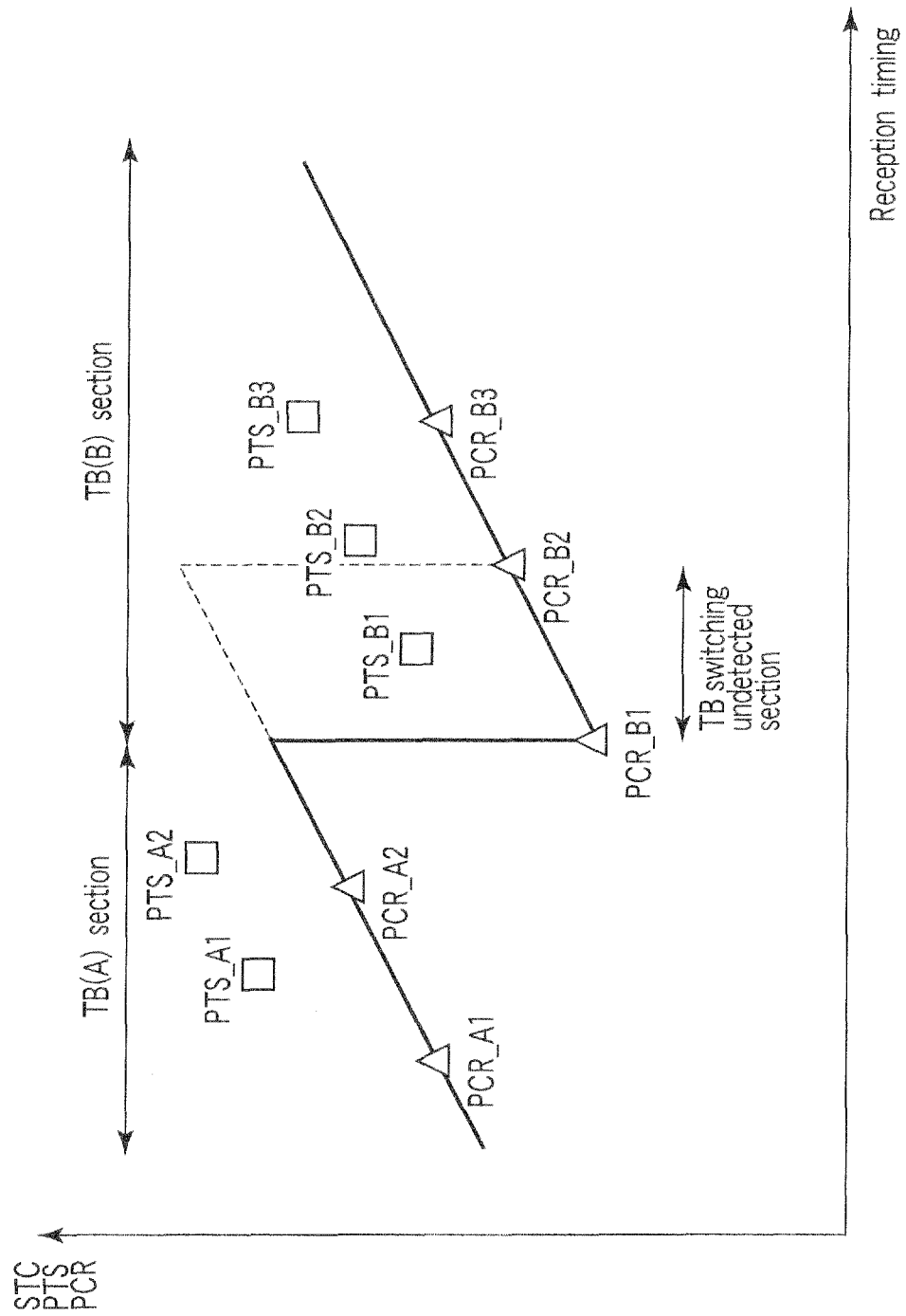
FIG. 5 is a graph showing reception timings at which TS packets are received by a reception unit shown in FIG. 1.

Now, the operation of the stream recording apparatus 100 in FIG. 1 will be more specifically described with reference to the flowchart in FIG. 4 and an example of reception of TS packets shown in FIG. 5.

First, FIG. 5 will be described. In FIG. 5, the ordinate indicates the values of STC counted by the STC counter 103 and of PTS and PCR in the received packets. The abscissa indicates reception timings for the TS packets. In the figure, A indicates PCR, and ☐ indicates the video PTS. PCR_A1, PCR_A2, PTS_A1, and PTS_A2 indicate PCR and PTS in a timebase A. PCR_B1, PCR_B2, PCR_B3, PTS_B1, PTS_B2, and PTS_B3 indicate PCR and PTS in a timebase B. However, PCR_B1 has not been received by an error. Further, solid lines show the transition of STC counted by the transmitter STC counter. Dashed lines show the transition of STC counted by the receiver STC counter 103 if an error in the reception of PCR_B1 precludes synchronization with the transmitter.

First, the stream recording apparatus 100 initializes the various variables and flags (step S301). Then, the reception unit 101 receives a TS packet containing PCR_A1 (step S302). The storage control unit 104 records the received TS packet in the TS packet storage unit 105 (step S303). The received packet has PCR_A1 (step S304), and the flag "STC counter operation" indicates "not in operation" (step S305). The syntax analysis unit 102 sets PCR_A1 in the STC counter 103 and also sets the flag "STC counter operation" to indicate "in operation" (step S308).

Then, the reception unit 101 receives a TS packet containing PTS_A1 (step S302). The storage control unit 104 records the received packet in the TS packet storage unit 105 (step S303). The received packet has no PCR (step S304), but the received packet has PTS_A1 (step S310). Consequently, STC and PTS_A1 are transferred to the timebase determination unit 106. Moreover, both PTS_A1 and STC are on the timebase A (step S311). The flag "starting point PTS setting status" indicates "unregistered" (step S312). Consequently, the reproduction time calculation unit 107 substitutes PTS_A1 into the variable "starting point PTS" recorded in the time information storage unit 108, and sets the flag "starting point PTS setting status" to indicate "registered" (step S313). Then, the reproduction time calculation unit 107 calculates the reproduction time (step S314). In this case, PTS is PTS_A1, the variable "starting point PTS" is PTS_A1, and the total reproduction time is 0. The reproduction time is thus calculated to be 0. If the picture to be processed is an IDR picture (step S315), the reproduction time calculation unit 107 records 0 as a reproduction time and PTS_A1 as a PTS in the supplemental information storage unit 109 in association with each other (step S316). The reproduction time calculation unit 107 then substitutes C as a reproduction time into the variable "pre-reproduction time" and records the result in the time information storage unit 108 (step S317).

Then, the reception unit 101 receives a TS packet containing PCR_A2 (step S302). The storage control unit 104 records the received packet in the TS packet storage unit 105 (step S303). The received packet has PCR_A2 (step S304), and the flag "STC counter operation" indicates "in operation" (step S305). Further, both STC and PCR_A2 are on the timebase A. Consequently, the timebase determination unit 106 determines that the "timebase has not been switched" (step S306).

Then, the reception unit 101 receives a TS packet containing PTS_A2 (step S302). The storage control unit 104 records the received packet in the TS packet storage unit 105 (step S303). The received packet has no PCR (step S304), but the received packet has PTS_A2 (step S310). Consequently, STC and PTS_A2 are transferred to the timebase determination unit 106. Further, both PTS_A2 and STC are on the timebase A (step S311), and the flag "starting point PTS setting status" indicates "registered" (step S312). The reproduction time calculation unit 107 thus calculates the reproduction time (step S314). In this case, PTS is PTS_A2, the variable "starting point PTS" is PTS_A1, and the total reproduction time is 0. Accordingly, the reproduction time is calculated by (PTS_A2−PTS_A1). Provided that the picture to be processed is an IDR picture (step S315), the reproduction time calculation unit 107 records the value of (PTS_2−PTS_A1) as a reproduction time and PTS_A2 as a PTS in the supplemental information storage unit 109 in association with each other (step S316). The reproduction time calculation unit 107 then substitutes the value of (PTS_A2−PTS_A1) as a reproduction time into the variable "pre-reproduction time" and records the result in the time information storage unit 108 (step S317).

A TS packet containing PCR_B1 on the timebase B should then be received, but is lost caused by an error, preventing the detection of timebase switching. It is thus assumed that the STC counter 103 continues to count STC on the timebase A as shown by dashed lines in FIG. 5.

Then, the reception unit 101 receives a TS packet containing PTS_B1 (step S302). The storage control unit 104 records the received packet in the TS packet storage unit 105 (step S303). The received packet has no PCP (step S304), but the received packet has PTS_B1 (step S310). Consequently, STC and PTS_1 are transferred to the timebase determination unit 106. STC is on the timebase A, and PTS_B1 is on the timebase B. The timebase determination unit 106 thus determines that the "timebase has been switched" (step S311).

Then, the reception unit 101 receives a TS packet containing PCR_B2 (step S302). The storage control unit 104 records the received packet in the TS packet storage unit 105 (step S303). The received packet has PCR_B2 (step S304), and the flag "STC counter operation" indicates "in operation" (step S305). STC is on the timebase A, and PCR_B2 is on the timebase B. The timebase determination unit 106 thus determines that the "timebase has been switched" (step S306). The syntax analysis unit 102 re-sets PCR_B2 in the STC counter 103 (step S307). Then, the storage control unit 104 sets the flag "starting point PTS setting status" to indicate "unregistered". The storage control unit 104 further adds the variable "pre-reproduction time" and the constant "initial delay amount" to the variable "total reproduction time" for update and records the result in the time information storage unit 108 (step S309). In this case, the variable "total reproduction time" obtained before processing is 0, and the variable "pre-reproduction time" is (PTS_A2−PTS_A1). Consequently, the variable "total reproduction time" is (PTS_A2−PTS_A1+ "initial delay amount").

Then, the reception unit 101 receives a TS packet containing PTS_B2 (step S302). The storage control unit 104 records the received packet in the TS packet storage unit 105 (step S303). The received packet has no PCR (step S304), but the received packet has PTS_B2. Consequently, STC and PTS_B2 are transferred to the timebase determination unit 106 (step S310). Further, both PTS_B2 and STC are on the timebase A (step S311), and the flag "starting point PTS setting status" indicates "unregistered". The reproduction time calculation unit 107 thus substitutes PTS_B2 into the variable "starting point PTS", and sets the flag "starting point PTS setting status" to indicate "registered". The reproduction time calculation unit 107 then records the resulting variable and flag in the time information storage unit 108 (step S313). The reproduction time calculation unit 107 then calculates the reproduction time (step S314). In this case, PTS is PTS_B2, the variable "starting point PTS" is PTS_B2, and the total reproduction time is (PTS_A2−PTS_A1+"initial delay amount"). Accordingly, the reproduction time is calculated by (PTS_A2−PTS_A1+"initial delay amount"). Then, provided that the picture to be processed is an IDR picture (step S315), the reproduction time calculation unit 107 records the value of (PTS_A2−PTS_A1+"initial delay amount") as a reproduction time and PTS_B2 as a PTS in the supplemental information storage unit 109 in association with each other (step S316). The reproduction time calculation unit 107 then substitutes the value of (PTS_A2−PTS_A1+"initial delay amount") as a reproduction time into the variable "pre-reproduction time" and records the result in the time information storage unit 108 (step S317).

Then, the reception unit 101 receives a TS packet containing PCR_B3 (step S302). The storage control unit 104 records the received packet in the TS packet storage unit 105 (step S303). The received packet has PCR_B3 (step S304), and the flag "STC counter operation" indicates "in operation" (step S305). Both STC and PCR_B2 are on the timebase B. The timebase determination unit 106 thus determines that the "timebase has not been switched" (step S306).

Then, the reception unit 101 receives a TS packet containing PTS_B3 (step S302). The storage control unit 104 records the received packet in the TS packet storage unit 105 (step S303). The received packet has no PCR (step S304), but the received packet has PTS_B3 (step S310). Consequently, STC and PTS_B3 are transferred to the timebase determination unit 106 (step S310). Both PTS_B3 and STC are on the timebase B (step S311), and the flag "starting point PTS setting status" indicates "registered" (step S312). The reproduction time calculation unit 107 thus calculates the reproduction time (step S314). In this case, PTS is PTS_B3, the variable "starting point PTS" is PTS_B2, and the total reproduction time is (PTS_A2−PTS_A1+"initial delay amount"). Accordingly, the reproduction time is calculated by (PTS_B3−PTS_B2+PTS_A2−PTS_A1+"initial delay amount"). Then, provided that the picture to be processed is an IDR picture (step S315), the reproduction time calculation unit 107 records the value of (PTS_B3−PTS_B2+PTS_A2−PTS_A1+"initial delay amount") as a reproduction time and PTS_B3 as a PTS in the supplemental information storage unit 109 in association with each other (step S316). The reproduction time calculation unit 107 then substitutes the value of (PTS_B3−PTS_B2+PTS_A2−PTS_A1+"initial delay amount") as a reproduction time into the variable "pre-reproduction time" and records the result in the time information storage unit 108 (step S317).

Further, if SD-VIDEO for ISDB-T is used as a recording format for the present embodiment, the TS packet storage unit 105 stores a Transport stream Object Data (TOD) file, and the supplemental information storage unit 109 stores an Media Object Information (MOI) file.

As shown in FIG. 6A, a TS packet with an Extended TS (ETS) header composed of 32 bits (=4 bytes) of "0" is recorded in the TOD file as a 192-byte ETS packet.

Further, as shown in FIG. 6B, the MOI file has supplemental information on the TOD file described in 12-byte TSE INFO fields. Specifically, PTS for an ETS packet relating to an DR picture recorded in the TOD file is stored in a 24-bit PTS field. Reproduction time information on PTS is stored in a 32-bit PbOffset Field. Further, 25-bit Transport Packet Index (TPI) indicates where in the TOD file, IDR with PTS described in the MOI file is present. That is, TPI is an index with which the ETS packet containing IDR recorded in the TOD file is searched for. To search for IDR with PTS described in the MOI file, TPI described in the MOI file in association with PTS is referenced. For example, if TPI is described as "10" in the MOI file, the desired ETS packet to be searched for is the tenth of the ETS packets in the TOD file from the head of the file.

Thus, when an ETS packet recorded in the TOD file is to be reproduced, if the reproduction time for the packet cannot be reproduced as in the case of, for example, Jps. Pat. Appln. KOKAI Publication No. 2001-359049, it is impossible to determine whether a significant change in the difference between consecutive PCRs in a recording stream is caused by timebase switching or a dropped packet resulting from an error. In contrast, PbOffset registered in the MOI file show a continuous value in spite of possible timebase switching, and a value reflecting timebase switching is recorded in PTS. Accordingly, when an increment in PbOffset is equal to an increment in PTS with respect to the continuous IDR registered in the MOI file, the equality can be determined to indicate the non-occurrence of timebase switching. When the increment in PbOffset is unequal to the increment in PTS, the inequality can be determined to result from timebase switching. Thus, according to the present embodiment, even if the timebase is switched to make PTS discontinuous, the reproduction time is prevented from being discontinuous. Therefore, an MOI file can be generated in a form that allows timebase switching to be detected.

As described above, the stream recording apparatus in accordance with the present embodiment calculates and records the reproduction time in the supplemental file together with PTS only if STC obtained upon reception of a TS packet and PTS contained in the TS packet are on the same timebase. After timebase switching, the stream recording apparatus calculates the reproduction time by adding the total reproduction time and initial delay amount on the preceding timebase to an increment in PTS from the starting point PTS on the current timebase. Therefore, the present embodiment can provide a stream recording apparatus capable of recording a reproduction time incrementing continuously even with possible timebase switching.

Additional advantages and modifications will readily occur to those skilled in the art. Therefore, the invention in its broader aspects is not limited to the specific details and representative embodiments shown and described herein.

What is claimed is:

1. A stream recording apparatus comprising:
   a reception unit configured to receive a transport stream containing transport stream packets which each include a program clock reference or a presentation time stamp or some combination thereof;
   a first storage unit configured to store the transport stream;
   an analysis unit configured to analyze the program clock references and the presentation time stamps, the analysis unit further configured to determine whether each transport stream packet includes a program clock reference;
   a counter configured to count a system time clock on the basis of a program clock reference;
   a calculation unit configured to calculate a reproduction time corresponding to a presentation time stamp when the analysis unit determines that the transport stream packet does not include a program clock reference and when the presentation time stamp is on a same timebase with reference to a system time clock obtained upon reception of a transport stream packet having the presentation time stamp, and not to calculate the reproduction time corresponding to the presentation time stamp when the analysis unit determines that the transport stream packet does not include a program clock reference and when the presentation time stamp is on a different timebase with reference to the system time clock; and
   a second storage unit configured to store the reproduction time in correspondence with the presentation time stamp when the reproduction time is calculated.

2. The apparatus according to claim 1, wherein the analysis unit detects a switching of the timebase on the basis of one of the program clock references and a system time clock obtained upon reception of the transport stream packet containing the program clock reference, the apparatus further comprises a third storage unit configured to store the another one of the presentation time stamps, which is set as a starting point in response to the detection of the switching, and the reproduction time is calculated on the basis of a time difference between the presentation time stamp and the starting point.

3. The apparatus according to claim 2, wherein the calculation unit calculates a last reproduction time before the detection of the switching, the third storage unit stores a total reproduction time based on the last reproduction time, and the reproduction time is calculated by adding the total reproduction time to the time difference.

4. The apparatus according to claim 3, wherein the total reproduction time is a value obtained by adding a preset initial delay amount to the last reproduction time before the detection of the switching.

5. The apparatus according to claim 1, wherein the analysis unit re-sets the program clock reference in the counter in response to detecting the switching.

6. The apparatus according to claim 4, wherein the initial delay amount corresponds to a 1 frame interval.

7. The apparatus according to claim 1, wherein the first storage unit is configured to store the transport stream packet contained in the transport stream as a transport stream object data file.

8. The apparatus according to claim 7, wherein the second recording unit stores the presentation time stamp and the reproduction time as a media object information file.

9. An apparatus capable of receiving moving picture, comprising:
   a receiving unit configured to receive a plurality of first packets which can contain first time information to be used to control a system clock and a part of a second packet, the second packet contains at least one encoded frame of the moving picture and second time information to be used to control reproduction of the frame;
   a counter configured to count the system clock based on first time information;
   an analyzing unit configured to analyze the second time information and the system clock which is counted by the counter at the time of reception of the first packet containing the second time information, the analyzing unit further configured determine whether the first packets include first time information; and
   a calculation unit configured to calculate a reproduction time corresponding to the second time information when the analyzing unit determines that the first packets do not include first time information and when a difference between the second time information and the system clock is smaller than a predetermined threshold, and not to calculate the reproduction time when the analyzing unit determines that the first packets do not include first time information and when the difference exceeds the threshold.

10. The apparatus according to claim 9, further comprising a second calculation unit configured to calculate a total reproduction time, and
    the calculation unit calculates the reproduction time by adding the total reproduction time to the difference between a second time information of a starting point and a previous second time information.

11. The apparatus according to claim 9, wherein the first time information is contained in a header of the first packet and the second time information is contained in a header of the second packet.

12. An apparatus capable of receiving moving picture, comprising:
    a receiving unit configured to receive a plurality of first packets which can contain first time information to be used to control a system clock and a part of a second packet, the second packet contains at least one encoded frame of the moving picture and second time information to be used to control reproduction of the frame;
    a counter, which is adjustable based on the first time information, configured to count the system clock;
    an analyzing unit configured to analyze the second time information and the system clock which is counted by the counter at the time of reception of the first packet containing the second time information, the analyzing unit further configured to determine whether the first packets include first time information; and a calculation unit configured to calculate a reproduction time corresponding to the second time information when the analyzing unit determines that the first packets do not include first time information and when a difference between the second time information and the system clock is smaller than a predetermined threshold, and not to calculate the reproduction time when the analyzing unit determines that the first packets do not include first time information and when the difference exceeds the threshold.

13. The apparatus according to claim 12, further comprising a second calculation unit configured to calculate a total reproduction time, and the calculation unit calculates the reproduction time by adding the total reproduction time to the difference between a second time information of a starting point and a previous second time information.

14. The apparatus according to claim 12, wherein the first time information is contained in a header of the first packet and the second time information is contained in a header of the second packet.

15. The apparatus according to claim 12, wherein the counter is adjusted each time the first packet containing the first time information is received.

16. The apparatus according to claim 9, wherein the analysis unit is further configured to detect when the timebase has been switched and, when the timebase has been switched, the analysis unit resets a program clock reference in the system clock counter based on the first time information and a total reproduction time is calculated.

17. The apparatus according to claim 12, wherein the analysis unit is further configured to detect when the timebase has been switched and, when the timebase has been switched, the analysis unit resets a program clock reference in the system clock counter based on the first time information and a total reproduction time is calculated.

18. The apparatus according to claim 9, wherein the calculation unit is further configured to detect that a starting point has not been set and, when the starting point has not been set, the calculation unit sets the starting point to the second time information and calculates the reproduction time.

19. The apparatus according to claim 12, wherein the calculation unit is further configured to detect that a starting point has not been set and, when the starting point has not been set, the calculation unit sets the starting point to the second time information and calculates the reproduction time.

* * * * *